Oct. 8, 1963 W. R. JOHNSTON 3,106,649
SENSING CIRCUIT EMPLOYING TWO TUNNEL DIODES TO PROVIDE
PROPER CURRENT DISTRIBUTION UPON ONE BEING SWITCHED
Filed Dec. 27, 1960

INVENTOR.
WILLIAM R. JOHNSTON
BY Lyon & Lyon
ATTORNEYS.

3,106,649
Patented Oct. 8, 1963

3,106,649

SENSING CIRCUIT EMPLOYING TWO TUNNEL DIODES TO PROVIDE PROPER CURRENT DISTRIBUTION UPON ONE BEING SWITCHED

William R. Johnston, Los Angeles, Calif., assignor to Ampex Corporation, Culver City, Calif., a corporation of California Filed Dec. 27, 1960, Ser. No. 78,752
6 Claims. (Cl. 307—88.5)

This invention relates to sensing amplifier circuits and, more particularly, to improvements therein.

An object of this invention is to provide a novel solid-state sensing amplifier.

Another object of this invention is to provide an improved sensing amplifier circuit which makes use of the properties of tunnel diodes.

Another object of the present invention is the provision of a high-speed sensing amplifier suitable for use with memory systems.

These and other objects of the invention are achieved by an arrangement wherein two tunnel diodes are connected in parallel. Voltage is supplied to these tunnel diodes from a high-impedance voltage source. The value of the voltage supplied is sufficient to establish these tunnel diodes in one of their quiescent states. A source of signals is connected to one of the tunnel diodes in a manner so that upon the occurrence of the signal it will trigger that diode to its second quiescent state. This effectuates a triggering of the second tunnel diode from its initial quiescent state to the second quiescent state. The tunnel diodes remain in their second quiescent states until restored to their initial states by a transistor which is connected in parallel with them to effectively reduce the voltage across them to a value below the value required to position them in their initial quiescent state.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figures 1, 2, 3:
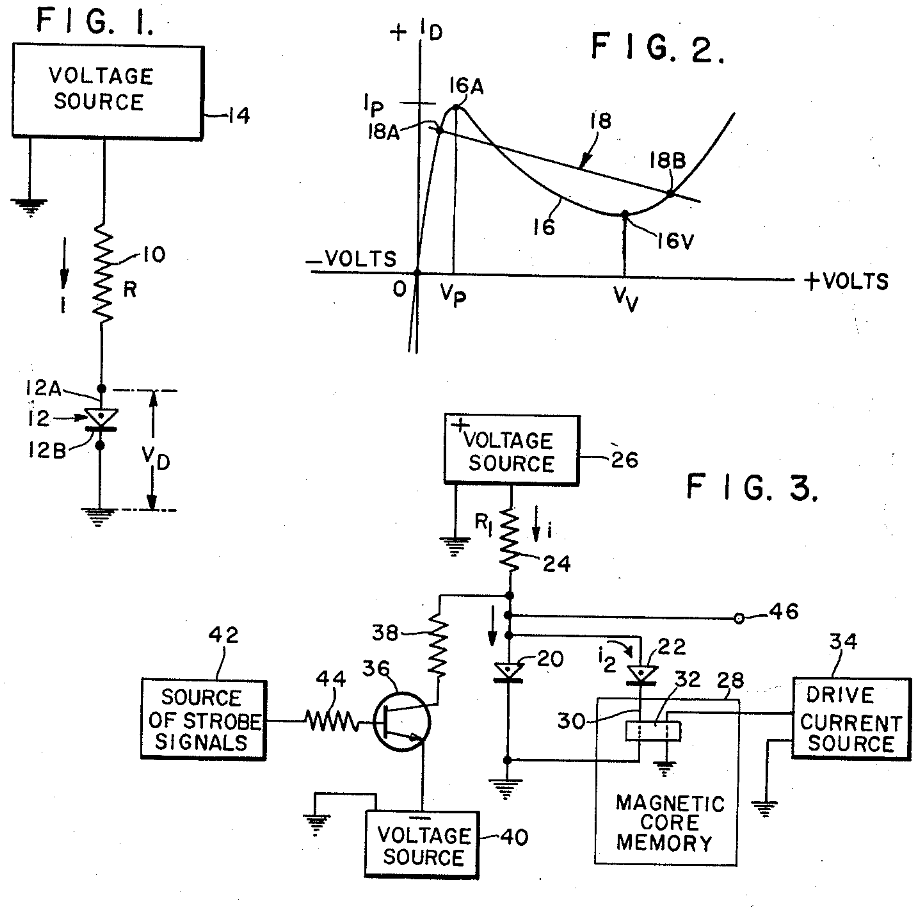
FIGURE 1 is a circuit diagram of a typical tunnel diode circuit which is shown to assist in an understanding of the invention.
FIGURE 2 is a diagram of the characteristics of a tunnel diode, shown to assist in an understanding of the invention.
FIGURE 3 is a circuit diagram of an embodiment of the invention used with unipolar signals.

Reference is now made to FIGURE 1, which shows a resistor 10 connected in series with a tunnel diode 12, which has an anode 12A and a cathode 12B. A voltage source 14 is connected to apply a voltage V across the resistor and tunnel diode.

Assume, now, that the voltage from the voltage source is permitted to gradually increase from zero. In FIGURE 2 there is shown a plot of the current flowing through the tunnel diode versus the voltage applied thereacross. The tunnel-diode characteristic is represented by the curve 16. As the voltage inreases to some value $V_P$, the current through the tunnel diode will increase to a peak value $I_P$. The point on the characteristic curve at which these values occur is indicated by 16A. As the voltage increases beyond the value $V_P$, the current through the tunnel diode decreases, manifesting the fact that the tunnel diode has a negative characteristic. Such decrease in current continues with increase in voltage until the voltage reaches the value $V_V$. The point on the curve 16, designated as 16V, indicates the lowest value of current which flows at the time that the voltage $V_V$ is applied across the tunnel diode. Thereafter, the current through the tunnel diode will increase with increasing voltage.

Between the two points 16A and 16V, there is a region in which the tunnel diode exhibits a negative resistance characteristic. This is not a stable region, and a tunnel diode will try to either go to a potential lower than $V_P$ or higher than $V_V$, both of which would be stable states. Effectively, therefore, the tunnel diode can be used as a bistable element. The load line for the circuit arrangement shown in FIGURE 1 is designated as 18 in FIGURE 2. This load line intersects the characteristic curve at points 18A and 18B. These are the stable points for the tunnel diode 12, and both of these points will satisfy the equation:

$$iR+V_D=V \qquad (1)$$

Where V is the applied voltage, $V_D$ is the voltage across the diode and $i$ is the current which flows through the resistor R and the tunnel diode series.

In the circuit arrangement shown in FIGURE 1, assume that the values of V received from the voltage source and the resistance 10 are such that the value of $V_D$ is at point 18A. Then the following equation may be established:

$$i_1R+V_{DA}=V \qquad (2)$$

This equation merely states that the sum of the voltage drop across the resistance 10 and across the tunnel diode, when the tunnel diode is established at point 18A on its characteristic curve, equals the voltage applied across the diode and the resistance.

If it were possible to raise the voltage across the tunnel diode at the junction that it makes with the resistance 10 so that the voltage across the tunnel diode will exceed the value of $V_P$, the value of current will exceed $I_P$ and the diode will then be transferred to the negative resistance region and will seek a new stable value of I, or current, which will satisfy the preceding equation. This new stable value of current will be at point 18B, where both $i$ and $V_D$ have changed until $$i_2R+V_{DB}=V \qquad (3)$$

Such transition can occur in a few millimicroseconds of time. The ratio of $V_V$ to $V_P$ are on the order of 5 or 10 to 1, so that the voltage change from point A to point B on the order of 10 times is attainable.

Reference is now made to FIGURE 3, which is a circuit diagram of an embodiment of the invention. This will include a first and second tunnel diode, respectively 20, 22, which have their anodes connected together and thereafter connected through a resistance 24 to a voltage source 26. The voltage source applies a positive voltage across the resistor and two tunnel diodes. The tunnel diode 20 has its cathode connected to ground. The tunnel diode 22 has its cathode connected to a circuit in which it is desired to sense the presence of a desired signal. This is here exemplified by a magnetic memory 28, and, more specifically, a sense winding 30, which is inductively coupled to one or more magnetic cores 32 in that memory and then is connected to ground. The sense winding is used for reading data stored in the cores. As is well known, data is stored in the cores in binary form by the state of remanence of the cores. This data is read out of the cores by driving them to one of their two states of remanence. Those cores already in that state of remanence do not produce a signal in a sense winding coupled to them. Those cores which have their state of remanence changed by the drive do induce a signal in the sense winding.

Current for driving the cores in the magnetic memory for the purpose of reading or writing is derived from a drive-current source 34. A transistor 36 has its collector connected through a resistor 38 to the junction of the resistor 24 with the two tunnel diodes 20, 22. The transistor 36 has its emitter connected to a negative voltage source 40. A source of strobe signals 42 applies these signals to the base of the transistor 36 through a resistor 44.

The magnetic memory 28, which is represented by the rectangle, exemplifies any source of signals which it is desired to sense. Thus, this is not to be construed as a limitation upon the invention, but merely exemplary of the use thereof. Furthermore, the sense winding 30, which is shown coupled to a single magnetic core 32, is exemplary of the utility of the invention herein to read the condition of a bistable element which is driven to provide an output signal. A sense winding 30 is normally connected to a plurality of cores, which is customary in this art, and when one of those plurality of cores is driven in response to a current applied for reading out the state of the core, then a voltage is induced in the sense winding.

The voltage source 26 and the resistor 24 have their values chosen such as to produce a stable load line (such as 18 in FIGURE 2) when both diodes 20, 22 are conducting in a quiescent state. The quiescent state here is considered to be when they are operating at point 18A on their characteristic curve. Upon interrogating a ferrite core by applying a current from the drive-current source 34, if the core is in the stable state from which it can be changed by the polarity of the drive current, a voltage is induced in the sensing winding 30. This voltage is negative-going and is applied by the sense winding to the cathode of diode 22. As a result, the voltage across the tunnel diode 22 increases until it exceeds the voltage value $V_P$ shown in FIGURE 2, as a result of which, in view of the previously discussed tunnel-diode characteristic, the tunnel diode changes to its second stable state at point 18B on its characteristic curve. However, to do this, the value of current flowing through the tunnel diode 22 must increase until it exceeds the peak value at point 16A on the characteristic curve. Instead of demanding more current to flow through resistor 24, which has a relatively high impedance value, the voltage at the anodes of the two tunnel diodes 20, 22 is pulled slightly negative by the signal—on the order of 15:25 millivolts. This lowers the value of the voltage across the tunnel diode 20, and thus reduces its current. This current is made available to tunnel diode 22, so that the current therethrough can increase up to the value $I_P$, from the quiescent value. Thus, a negative signal applied to the cathode of tunnel diode 22 causes it to shunt enough current away from tunnel diode 20 to enable tunnel diode 22 to pass through the point 16A on the characteristic curve, whereupon the current therethrough will decrease. This decrease in the current flowing through tunnel diode 22 reacts back upon tunnel diode 20, to cause it to exceed its current requirement at $V_P$, whereupon it, too, changes to the new stable voltage point 18B on its characteristic curve. Both diodes remain at point 18B until they are transferred back to the stable point 18A by lowering the voltage applied across them.

Such transfer from the stable point 18B to the stable point 18A is performed by applying a signal to the base of transistor 36 to render it highly conductive. Since the value of $V_P$ for tunnel diodes is very low (about 50 millivolts), the emitter of the transistor 36 must be made negative to ground. By driving the transistor into its saturation condition, the tunnel diodes 20, 22 may be reset to point 18A on their characteristic curve.

For operating the sensing amplifier in association with a magnetic-core memory, the transistor 36 is maintained conductive during the writing interval, and thereafter it is strobed and cut off during the reading interval by a negative pulse applied to its base from the source of strobe pulses 42. A large output pulse produced by the change of voltage across the tunnel diodes from the value at point 18B on their characteristic curve to the value at point 18A indicates that a signal was sensed when the core in the memory was driven. If there is a very small output merely caused by the removal of the drive applied by transistor 36 indicative of a change of voltage value from a low value to the point 18A on the characteristic curve, then it is known that no output signal was sensed. During write time for a memory, the transistor 36 may be rendered conductive in saturation, whereby it operates to clamp the tunnel diodes and to prevent them from being driven by the signals generated during the process of writing. It also serve to reset the tunnel diodes 20 and 22 to point 18A on their characteristic curve, which hereafter is referred to as the zero state. Thereafter, the transistor may be rendered nonconductive for the reading operation.

Figure 4:
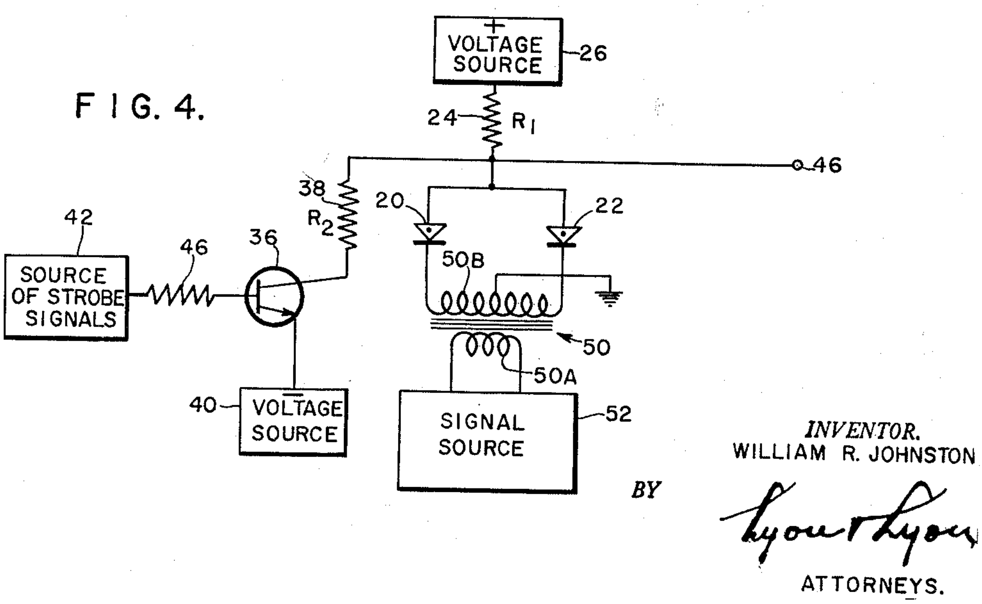
FIGURE 4 is a circuit diagram of an embodiment of the invention suitable for use with signals of both polarities.

The circuit described in FIGURE 3 is a unipolar sensing circuit. In FIGURE 4 there may be seen a circuit for sensing bipolar signals. Effectively, this circuit is the same as that shown in FIGURE 3, except that the input to the two tunnel diodes 20, 22 is by way of a transformer 50, which has a primary winding 50A and a center-tapped secondary winding 50B. A signal source 52 drives the primary winding of the transformer. The center tap of the secondary winding is connected to ground. One end of the secondary winding is connected to the cathode of tunnel diode 22, and the other end of the secondary winding is connected to the cathode of the tunnel diode 20. The operation of the circuit shown in FIGURE 4 is the same as has been described for FIGURE 3, with the exception that now the signal of negative polarity will cause tunnel diode 22 to operate as has been described, and a signal of positive polarity will cause tunnel diode 20 to operate as has been described in connection with tunnel diode 22 previously.

The sensitivity of the circuit which has been described is set up by regulating the amount of current drawn by the tunnel diodes when they are in their reset state—that is, by regulating the position of point 18A on the characteristic curve. The closer that point 18A is to the maximum current point 16A, the more sensitive the behavior of the circuit. When the tunnel diodes are at point 18A on their characteristic curve, they present a rather low impedance to the input signal, on the order of 40 to 50 ohms. This produces a very stable condition and thus makes for an excellent discrimination between "zero" signals and "one" signals derived from a magnetic core which is driven. The signal-to-noise ratio is less than 2:1, and the circuit can discriminate very reliably. Because of the large reverse direction of $V_V$ to $V_P$ voltage required to reset the diodes, this circuit can also act as a register to store the information of the fact of its transfer from one to the other state of stability until it is reset. Thus, this circuit is not only good for sensing operations, but, also, it is an excellent discriminator and a register.

There has accordingly been described and shown herein a novel, simple, and useful signal-sensing circuit which is all solid state and employs tunnel diodes in a manner to take optimum advantage of their characteristics.

I claim:

1. A signal-sensing amplifier comprising a first and second tunnel diode each having an anode and a cathode and each having two stable states, means for connecting said two tunnel diode anodes together, means including a transistor connected to said tunnel diodes for establishing said tunnel diodes in one of their two stable states, and means for applying signals to be sensed to the cathode of one of said tunnel diodes to transfer both said tunnel diodes to their second stable states.

2. A signal-sensing amplifier circuit comprising a first and second tunnel diode each having an anode and cathode and each having two stable states, means for coupling said tunnel diodes in parallel, means for applying potential across said tunnel diode anodes and cathodes to establish them at one of their stable states, means for applying signals to be sensed to the cathode of one of said tunnel diodes to transfer both said tunnel diodes to their second stable states, and means coupled to said tunnel diodes for returning them to their first stable states.

3. A signal-sensing amplifier circuit as recited in claim 2 wherein said means coupled to said tunnel diodes for returning them to their first stable states includes means for substantially removing the potential applied thereacross.

4. A signal-sensing amplifier circuit comprising a first and second tunnel diode each having an anode and cathode and each having two stable states, means including a resistor for applying a potential across both said tunnel diodes in parallel for establishing said tunnel diodes in one of their two states of stability, means for applying a signal to be sensed to the cathode of one of said tunnel diodes for transferring both said tunnel diodes to their other states of stability, a transistor having a base, collector and emitter electrode, means for applying a signal to said transistor base to render it conductive in saturation, and means for coupling said transistor collector and emitter between both said tunnel diodes, anodes and cathodes to reduce the potential thereacross when conducting in saturation for returning said tunnel diodes toward their first stable states.

5. A signal-sensing amplifier as recited in claim 4 wherein said means for applying a signal to be sensed to the cathode of one of said tunnel diodes includes a transformer having a primary winding and a secondary winding having two ends and a center tap, each of the cathodes of said tunnel diodes being connected to a different one of the ends of said secondary winding, and means for applying said signal to be sensed to said primary winding.

6. A signal-sensing amplifier comprising a pair of tunnel diodes each having an anode and a cathode, a first resistor having one end connected to both said tunnel diode anodes, a source of positive operating potential, means connecting said source of positive operating potential between the other end of said first resistor and both said tunnel diode cathodes, means for applying a signal to be sensed to one of said tunnel diode cathodes for increasing the potential across both tunnel diodes, a transistor having base, emitter and collector electrodes, a second resistor connected between said collector and the anodes of said tunnel diodes, a source of negative potential connected between said emitter and the cathodes of said two tunnel diodes, and means for applying a signal to the base of said transistor for driving it into saturation for reducing the potential across said tunnel diodes.

References Cited in the file of this patent

Miller et al.: "The Tunnel Diode as a Storage Element," 1960, International Solid-State Circuits Conference, Feb. 11, 1960, pages 52–53.